US010784699B2

(12) United States Patent
Baker

(10) Patent No.: US 10,784,699 B2
(45) Date of Patent: Sep. 22, 2020

(54) SYSTEMS AND METHODS OF POWERING CIRCUITS WITH NEAR END-OF-LIFE BATTERIES

(71) Applicant: Moen Incorporated, North Olmsted, OH (US)

(72) Inventor: Daniel W. Baker, Medina, OH (US)

(73) Assignee: Moen Incorporated, North Olmsted, OH (US)

(*) Notice: Subject to any disclaimer, the term of this patent is extended or adjusted under 35 U.S.C. 154(b) by 681 days.

(21) Appl. No.: 15/446,464

(22) Filed: Mar. 1, 2017

(65) Prior Publication Data
US 2017/0256974 A1 Sep. 7, 2017

Related U.S. Application Data

(60) Provisional application No. 62/301,657, filed on Mar. 1, 2016, provisional application No. 62/464,881, filed on Feb. 28, 2017.

(51) Int. Cl.
*H02J 7/00* (2006.01)
*H01M 16/00* (2006.01)
*H02J 7/34* (2006.01)

(52) U.S. Cl.
CPC ........... *H02J 7/0068* (2013.01); *H01M 16/00* (2013.01); *H02J 7/007* (2013.01); *H02J 7/345* (2013.01); *H02J 2007/0067* (2013.01)

(58) Field of Classification Search
CPC .......... H02J 7/0068; H02J 7/007; H02J 7/345; H01M 16/00
USPC ......................................................... 320/166
See application file for complete search history.

(56) References Cited

U.S. PATENT DOCUMENTS

| 5,815,365 A | * | 9/1998 | Stege | H01F 7/1805 361/156 |
| 6,076,550 A | * | 6/2000 | Hiraishi | F16K 31/0655 137/550 |
| 6,826,455 B1 | * | 11/2004 | Iott | H02J 7/345 323/222 |
| 8,843,241 B2 | * | 9/2014 | Saberi | H04Q 9/00 700/287 |
| 2007/0199147 A1 | * | 8/2007 | Mitchell | A47D 9/04 5/109 |
| 2012/0319612 A1 | * | 12/2012 | Weil | H05B 33/0818 315/240 |
| 2013/0190934 A1 | * | 7/2013 | Holindrake | A01G 25/16 700/284 |

(Continued)

FOREIGN PATENT DOCUMENTS

| WO | 2015138038 | 9/2015 |
| WO | WO2015/138038 | * 9/2015 |

OTHER PUBLICATIONS

Hydrotek International Inc. "Operation & Maintenance Manual HB-8000C Series Flush Valve"; Mar. 1, 2011; [retrieved Apr. 26, 2017]. Publication online <URL:http://www.hydrotekintl.com/wp-content/uploads/2011/02HB8000C-Series-OM-Manual.pdf>.

(Continued)

*Primary Examiner* — Nathaniel R Pelton
(74) *Attorney, Agent, or Firm* — Calfee, Halter & Griswold LLP

(57) ABSTRACT

The present application discloses systems and methods of powering a solenoid circuit and other circuits with batteries that are at (or near) the end of their functional life.

20 Claims, 12 Drawing Sheets

(56) References Cited

U.S. PATENT DOCUMENTS

| | | | | |
|---|---|---|---|---|
| 2015/0005965 A1* | 1/2015 | Ensworth | ............... | A01G 25/16 700/284 |
| 2015/0171745 A1* | 6/2015 | Smith | ................... | H02J 7/0065 323/311 |
| 2016/0164310 A1* | 6/2016 | Juntunen | ................. | H02J 7/007 320/134 |

OTHER PUBLICATIONS

International Search Report and Written Opinion from PCT Application No. PCT/US17/20168 dated Mar. 1, 2017.

* cited by examiner

SYSTEMS AND METHODS OF POWERING CIRCUITS WITH NEAR END-OF-LIFE BATTERIES

CROSS-REFERENCE TO RELATED APPLICATIONS

This application claims priority to and the benefit of U.S. Provisional Patent Application Ser. No. 62/301,657, entitled "SYSTEMS AND METHODS OF POWERING CIRCUITS WITH NEAR END-OF-LIFE BATTERIES" and filed Mar. 1, 2016, and U.S. Provisional Patent Application Ser. No. 62/464,881, also entitled "SYSTEMS AND METHODS OF POWERING CIRCUITS WITH NEAR END-OF-LIFE BATTERIES" and filed Feb. 28, 2017, the entire disclosures of both of which are incorporated herein by reference as though fully recited herein.

FIELD

The present application generally relates to the field of battery-powered circuitry and, more specifically, to systems and methods of powering a circuit with near end-of-life batteries.

BACKGROUND

Typical alkaline batteries are sold in several common forms, such as AA cells and AAA cells. Such batteries have a nominal voltage of about 1.5 VDC when fresh and have a battery end-of-life voltage (also known as a "cutoff voltage") of about 0.9 VDC, below which battery manufacturers and circuit designers recognize that the voltage delivered by a battery is reduced to the point that substantially all of the available energy from the battery has been delivered (and below which leakage might occur). Some alkaline batteries have an end-of-life voltage of 0.8 VDC, e.g., ENERGIZER brand E91 AA zinc-manganese dioxide ($Zn/MnO_2$) batteries. Many devices will not function when powered by 1.5 VDC alkaline batteries that are close to their end-of-life voltage of 0.9 VDC or 0.8 VDC because such dead or nearly dead batteries lack sufficient current capacity to power such devices. Typical lithium batteries are sold in several common cylindrical forms, such as AA cells and AAA cells. Such batteries have a nominal voltage of about 1.5 VDC when fresh (e.g., about 1.7 VDC for a Lithium/Iron Disulfide (Li/FeS2) cylindrical lithium AA cell) and have a battery end-of-life voltage (also known as a "cutoff voltage") of about 0.8 VDC, e.g., L91 batteries. Many devices will not function when powered by 1.5 VDC lithium batteries that are close to their end-of-life voltage of 0.8 VDC because such dead or nearly dead batteries lack sufficient current capacity to power such devices. Accordingly, many devices have circuitry designed to stop functioning and give a dead battery indication when the open circuit voltage of each of its batteries is at about 1.2 VDC (or the batteries have a loaded voltage indicating an open circuit voltage at about the same "first cut" level).

SUMMARY

The present application discloses systems and methods of powering a solenoid circuit and other circuits with batteries that are at or near the end of their functional life. In some exemplary embodiments, the circuitry is configured to be capable of driving a solenoid circuit while running on three or four alkaline or lithium AA or AAA dry cells that are considered to be "nearly dead." As used herein, a "nearly dead" battery, synonymous with a "near end-of-life battery" herein, is a battery that has an open circuit voltage greater than, but no more than 10% above, its end-of-life voltage (or 10% above some other end-of-life parameter, such as 10% above its end-of-life mA-hour rating), e.g., 0.81 to 0.88 VDC for an alkaline battery having an end-of-life open circuit voltage of 0.8 VDC. In some exemplary embodiments, the circuitry is configured to be capable of driving a solenoid circuit while running on three or four alkaline or lithium AA or AAA dry cells that are considered to be at an end-of-life parameter, i.e., "dead," or even just under an end-of-life parameter. As used herein, a "dead" battery is a battery at or under its end-of-life open circuit voltage, e.g., less than or equal to 0.9 VDC or 0.8 VDC for many alkaline 1.5 VDC batteries using current technology and 0.8 VDC for many lithium 1.5 VDC batteries using current technology (or at some other end-of-life parameter, such as at its end-of-life mA-hour rating).

One exemplary embodiment of the present disclosure relates to a circuit providing electrical power to drive a solenoid-actuated valve from a battery. The circuit includes at least one capacitor in electrical communication with the solenoid; an electrically controlled switch having at least a first state and a second state; an inductor receiving electrical energy from the battery when the switch is in the first state, and releasing energy into the capacitor via a diode when the switch is in the second state; a first control unit configured to controllably change the switch between its first and second states to controllably charge the capacitor to a voltage of about 15-40 volts DC with electrical energy from the battery, the first control unit controlling the switch to draw about 15 mA to about 100 mA from the battery while charging the capacitor; and a second control unit configured to controllably release energy stored in the capacitor to the solenoid to change the valve state.

The Appendix is a functional block diagram of a TEXAS INSTRUMENTS brand TPS61160ADRVR, which is used in several of the embodiments.

DETAILED DESCRIPTION

This Detailed Description describes exemplary embodiments of the invention and is not intended to limit the scope of the claims in any way. Indeed, the invention as claimed is broader than the exemplary embodiments, and the terms used in the claims have their full ordinary meaning, unless a limiting definition is expressly provided herein.

Figure 1:
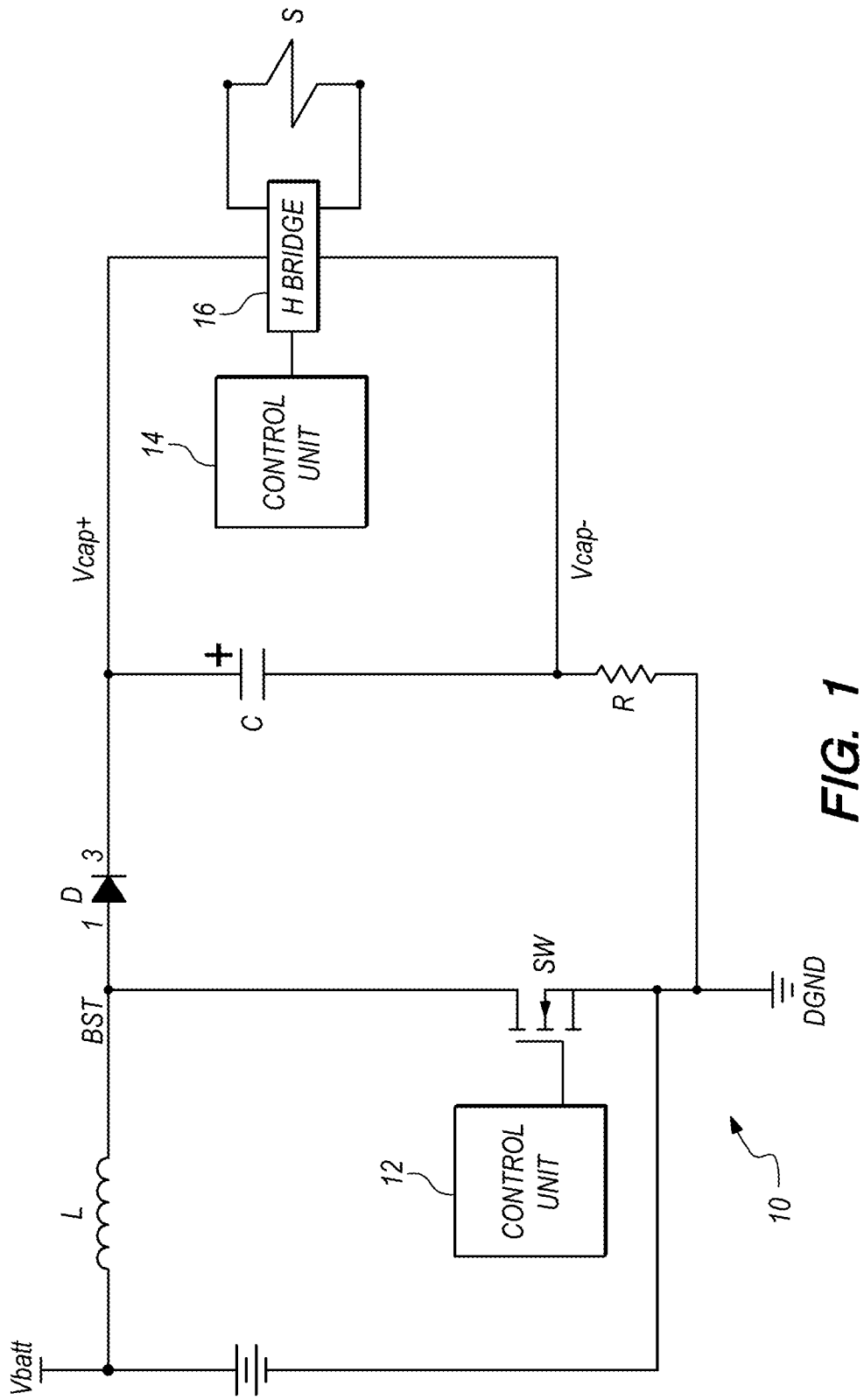
FIG. 1 is a schematic block diagram of an exemplary electronic battery circuit.

Referring now to FIG. 1, a block diagram of an exemplary battery circuit 10 providing electrical power to drive a solenoid-actuated valve from a battery is shown. Exemplary battery circuit 10 comprises at least one capacitor C in electrical communication with the solenoid S, an electrically controlled switch SW having at least a first state and a second state, an inductor L receiving electrical energy from the battery $V_{batt}$ (e.g., a plurality of alkaline or lithium dry cell batteries) when the switch SW is in the first state, and releasing energy into the capacitor C via a diode D when the switch SW is in the second state. A battery is shown in FIG. 1 and, although not shown in the other figures, it is understood that Vbatt in all the circuits is provided by one or more batteries. In exemplary embodiments, the one or more batteries are connected to the circuit via electrical wiring and a battery connector. A first control unit 12 is configured to controllably change the switch SW between its first and second states to controllably charge the capacitor C to a voltage of about 15-40 volts DC with electrical energy from the battery. In some exemplary embodiments, the first control unit 12 controls the switch SW to draw about 15 mA to about 100 mA through the inductor L from the battery while charging the capacitor C. In some exemplary embodiments, the circuitry 10 is configured as a boost converter in which energy stored in the inductor L is released through diode D and stored on capacitor C (the first control unit 12 repeatedly switches the switch SW from one state to the other, charging the inductor and discharging the energy through the diode D into the capacitor C). In some exemplary embodiments, the circuitry 10 is configured as a constant current boost converter. A second control unit 14 is configured to controllably release energy stored in the capacitor C to the solenoid S to change the state of the valve (e.g., B in FIGS. 3-5). In some exemplary embodiments, the second control unit 14 controls an H-bridge 16 to controllably release energy stored in the capacitor C to actuate the solenoid S to change the state of the valve. Other circuits can be used in place of the H-bridge, such as solenoid driver integrated circuits.

The first and second control units 12, 14 of exemplary battery circuit 10 have logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a state machine, a software controlled processor, discrete logic such as an application specific integrated circuit (ASIC), a programmed logic device, or other processor. "Processor" or "computer" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), complex programmable logic devices (CPLDs), etc. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

In some exemplary embodiments, the first and second control units 12, 14 comprise a state machine and/or a pre-programmed processor. In exemplary embodiments, some or all of the software is stored on internal memory (not shown) of the first and second control units 12, 14, which includes one or more non-transitory computer readable media of one or more local or remote data storage devices (for remote memories, system 10 will include a communications circuit, not shown). As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., RAM, ROM, PROM, EPROM, EEPROM, flash PROM, external flash memory drives, etc.

In some exemplary embodiments, the battery powering the circuit comprises or consists of a number of alkaline or lithium dry cell batteries, e.g., three or four AA or AAA alkaline dry cell batteries, such as, ENERGIZER brand E91 AA zinc-manganese dioxide ($Zn/MnO_2$) batteries. In some exemplary embodiments, one advantage of the circuit 10 is that the circuit 10 is capable of driving a solenoid having these characteristics—an inductance of 5-20 mH, a resistance of 5-20 ohms, a current of 300-600 mA, and a voltage 4.8-6.4 (such as, a solenoid opening with 45 millijoules, e.g., a 10-20 mH solenoid opening 80 PSI when driven by 500 mA at 5.2 VDC)—while running on four such AA dry cells with open circuit voltages of 0.8 VDC, which is the end-of-life voltage for such batteries. That is, in some exemplary embodiments, one advantage of the circuit 10 is that the circuit is capable of driving such a solenoid while running on three or four such AA dry cells (or other batteries) that are considered to be "dead." Obviously, all circuits falling within the scope of the present claims need not be so configured, however it is clearly an advantage of many exemplary embodiments that they are able to function on AA dry cells having an open circuit voltage less than 1.2 VDC or less than 1.1 VDC or even less than 1.0 VDC (e.g., all of these greater than the end of life voltage, such 0.8 VDC). In contrast, some prior art circuits cease functioning, e.g., give a replace battery warning and refuse to actuate the solenoid, when the dry cells have an open circuit voltage of about 1.2 VDC.

In some exemplary embodiments, the inductor L is an unshielded power inductor in the range of 1-100 µH, or in the range of 10-33 µH, such as about 22 µH. In some exemplary embodiments, the inductor L is directly connected to the battery to permit the circuit to function at the lower end of the life of the battery, e.g., the lower end of the life of the dry cell batteries. In the context of this disclosure, the inductor being directly connected to the battery means that there are no diodes, bipolar junction transistors, or other active components with a nontrivial voltage drop (non-resistive voltage drop) between the battery and the inductor L. Some battery boost circuits will have a diode between the battery and the inductor. This has the unfortunate consequence of putting about a 0.7 VDC voltage drop between the battery and the inductor, which prevents that circuit from working all the way down to the end-of-life voltage of those batteries. Obviously, in implementations of the present circuitry there will be some resistance between the battery and the inductor L, e.g., resistance from printed circuit board traces and any cables, and perhaps some active components therebetween having a resistive effect, such as one or more field effect transistors (FETs) in the circuit between the battery and the inductor L; however, such resistance should be low enough that using the circuit to draw about 15 mA to about 100 mA from the battery while charging the capacitor will not adversely affect the ability of the circuit to function at the battery's end-of-life voltage.

In some exemplary embodiments, the switch SW consists of or comprises one or more FETs. In some exemplary embodiments, the switch SW and the first control unit 12 comprise a single integrated circuit, such as a boost integrated circuit or an LED driver circuit configured in constant current mode. In other exemplary embodiments, the switch SW and the first control unit 12 are separate components. In some exemplary embodiments, the first control unit 12 and the second control unit 14 comprise a single control unit, such as a preprogrammed processor in circuit communication with the switch SW and the H bridge 16 (or other circuitry controllably releasing the charge from capacitor C to drive the solenoid S).

It is important that the capacitor C have a large enough capacity to drive the solenoid S via H bridge 16 or other circuitry controllably releasing the charge from capacitor C. The capacitor C can comprise or consist of a single capacitor or a plurality of capacitors. Obviously, if a plurality of capacitors are used in parallel, the capacitance of capacitor C will be the sum of the capacitance of the individual capacitors forming capacitor C. In some exemplary embodiments, the capacitor C is a single electrolytic capacitor in the range of 47-470 µF, or in the range of 100-330 µF, such as about 220 µF. The voltage rating of the capacitor C will depend on the highest voltage to which the capacitor is charged prior to actuating the solenoid S, discussed below. Using currently available technology, the capacitor C will physically be the largest component (larger than the inductor L, the diode D, and the switch SW). In some exemplary embodiments, the total volume of capacitor C will be in the range of 0.3-10 $cm^3$, or in the range of 0.5-7 $cm^3$, such as about 1 $cm^3$.

In some exemplary embodiments, the first control unit 12 is configured to controllably change the switch SW between its first and second states to controllably charge the capacitor C to a voltage of about 15-40 volts DC with electrical energy from the battery immediately prior to actuating the solenoid S. In some exemplary embodiments, the first control unit 12 is configured to maintain a voltage of about 5-10 VDC on the capacitor C, e.g., 5-7 VDC, which shortens the amount of time it will take to increase the voltage on the capacitor C to about 15-40 VDC to actuate the solenoid S. In other exemplary embodiments, the first control unit 12 is configured to maintain no voltage in particular on the capacitor C (the capacitor voltage will naturally be no lower than about Vbatt–0.7 VDC, i.e., Vbatt minus a diode voltage drop); however, in these embodiments, more time is needed to increase the voltage on the capacitor C to about 15-40 VDC to actuate the solenoid S. In some exemplary embodiments, energy from the battery is ordinarily not used while energy from the capacitor is used to open or close the solenoid S. That is, in some exemplary embodiments, the first and second control units 12, 14 cooperate and are programmed so that the first control unit 12 does charge the capacitor C with electrical energy from the battery prior to the second control unit 14 opening or closing the solenoid S with energy stored in the capacitor C, but the first control unit 12 ordinarily does not charge the capacitor C (or drive the solenoid S) with electrical energy from the battery while the second control unit 14 is opening or closing the solenoid S with energy stored in the capacitor C.

The diode D must be able to handle the currents generated by the first control unit 12 switching the switch SW between its states to charge the capacitor C (e.g., 15-100 mA) and must be able to cut off reverse current fast enough to keep up with the switching frequency of the first control unit 12 (e.g., 600 KHz). In some exemplary embodiments, the diode D comprises or consists of one or more silicon switching diodes, e.g., one or more BAS16 W fast switching diodes, which have a specified reverse recovery time of about 4 ns, or a DMN3065LW-7 MOSFET wired as a diode (i.e., source tied to gate so the internal diode functions as diode D, e.g., FET Q8 in FIG. 7A). Additionally, if the boost converter circuit is also going to be bypassed for a higher current application, such as a soap pump, discussed below in connection with FIG. 6, the BAS16 W diode must be replaced with a different diode that handles more current (a typical soap pump will draw more current than the BAS16 W diode is rated to handle), such as a DMN3065LW-7 MOSFET wired as a diode (e.g., Q8 in FIG. 7A).

In some exemplary embodiments, the H-bridge 16 comprises or consists of four FETs, e.g., two FDC6506 FETS and two DMN3065LW-7 FETs, with associated resistors and diodes, if needed. In the alternative, an H-bridge chip or other solenoid driver chip can be used. In some exemplary embodiments, the H-bridge 16 floats on Vcap–, which should not be above 0.2V during normal operation, which isn't enough to affect FET drive.

Figure 2:
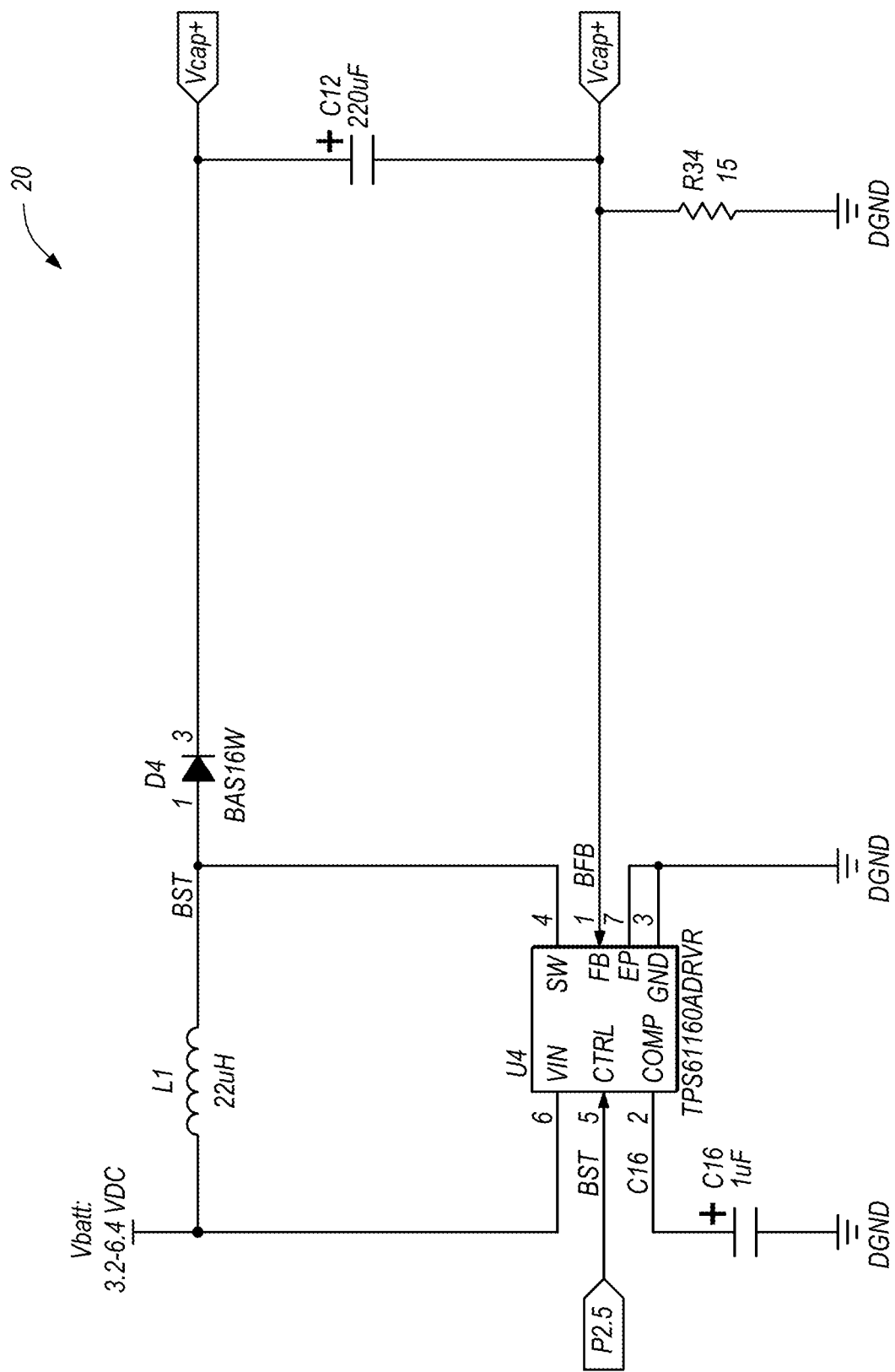
FIG. 2 is a schematic block diagram of another exemplary electronic battery circuit.

As mentioned above, in some exemplary embodiments, the switch SW and the first control unit 12 comprise a single integrated circuit, such as an LED driver circuit configured in constant current mode. Referring now to FIG. 2, an exemplary circuit 20 in that configuration is shown. FIG. 2 is an example of an implementation of the left half of FIG. 1 (the battery, inductor L, capacitor C, switch SW, and first control unit 12). The rest of the circuit on this example would be the same as FIG. 1 and the text describing that figure. In exemplary circuit 20, chip U4 is an LED driver circuit having both the switch SW and the first control unit 12 of FIG. 1 in a single integrated circuit. The battery consists of four alkaline AA cells connected in series having a collective nominal open circuit voltage of 6.4 VDC when fresh and a collective end-of-life open circuit voltage of 3.2 VDC. The exemplary circuit 20 is configured to function in constant current mode and will function throughout the range of Vbatt of 6.4 VDC down to 3.2 VDC, the end-of-life voltage for the four alkaline batteries. The circuit of FIG. 2 will actually function with four "dead" AA cells from 3.2 VDC down to 2.7 VDC (0.8 VDC down to 0.675 VDC per cell), although this may be inadvisable because alkaline batteries have a tendency to leak caustic material when their open circuit voltage drops below 0.6 VDC. Accordingly, in exemplary embodiments, the circuit is prevented from running using dead batteries, even though it is capable of doing so. In this exemplary circuit, the inductor L (i.e., L1) is a 22

μH unshielded power inductor, the diode D (i.e., D4) is a BAS16 W fast switching diode (or a FET used as a diode, like Q8 in FIG. 7A), the capacitor C (i.e., C12) is a 220 μF electrolytic capacitor, and U4 is a constant current LED driver that implements both the switch SW and the first control unit 12 in a single package, i.e., a TEXAS INSTRUMENTS brand TPS61160ADRVR, which is a white LED driver with digital and PWM brightness control. Other constant current boost driver circuits can be used in other circuits based on the teachings herein. Similarly, other boost circuits can be used in other circuits based on the teachings herein. Capacitor C16 is a 1 μF compensation capacitor that is used to stabilize the feedback loop of U4. The switching rate of U4, i.e., the rate at which current flows through the inductor L1 alternatively between (a) the internal switch and (b) the diode to the capacitor C12, is internally set in U4 at about 600 KHz. Other frequencies can be used in other circuits. Resistor R34 is a 15 ohm resistor positioned between the FB (feedback) pin of U4 and ground and is used as a current sense resistor in series with the capacitor C12 to set the charging current through the capacitor C12. The circuit of FIG. 2 (along with the second control unit 14, H-bridge 16, and solenoid S controlled valve of FIG. 1), functions as described in the text describing the various exemplary embodiments in connection with FIG. 1, above.

In some exemplary embodiments, the second control unit is a preprogrammed processor, e.g., a TEXAS INSTRUMENTS brand MSP430G2553 processor preprogrammed as discussed herein. The second control unit 14 controls the operation of the booster circuit of FIG. 2 via the CTRL pin. That is, the second control unit 14 controls the voltage on capacitor C12 via the CTRL pin (via pin P2.5 of the MSP430). More specifically, the voltage on the capacitor C12 is controlled by the second control unit 14 monitoring the voltage on capacitor C12 and using Pin P2.5 to turn on or off U4 as needed, as discussed in more detail below. Toward this end, the capacitor voltage is input into the second control unit 14, which has an internal analog-to-digital converter.

In some exemplary embodiments, the boost converter is designed to drive an output current as opposed to a voltage (some LED drivers will do this). If so, the efficiency is specified for the target application, and efficiency can be very important in some embodiments; such a boost converter enables the circuitry to optimize battery performance. The circuit of FIG. 2 has an efficiency of about 82-83%, perhaps 82-84% or 85% in a volume of about 4-5 cc (excluding the volume of the batteries and conductors connecting the circuit to the batteries). Other converters can be used, but might be cost-prohibitive (a 95% efficient boost converter would be very expensive) using current technology. That said, circuits with efficiencies of 80-97% without regard to volume (using current technology) and circuits with 80-86% efficiency with a relatively small volume (e.g., 3-10 cc) could all take advantage of the teachings herein.

The boost converter in the circuit of FIG. 2 is configured to consume approximately 0.3 Watts while charging the capacitor, so each battery must supply 0.075 Watts. At about 1.25 volts per cell (average, mid life for an AA cell), that's about 60 mA to power the boost converter while charging. Without a boost converter one would need a lot more power and current from the batteries, e.g., close to 10× the above numbers (albeit for about one tenth of the time). But the battery mAh capacity is greater when one consumes less current from the battery, so use of the boost circuit permits more actuation cycles than would be possible without use of the boost circuit. Moreover, $I^2R$ losses in a battery are ten times less (one tenth the current results in 1/00 the power dissipated when the boost circuit is used). In some exemplary embodiments, it is important to select a boost converter chip that is capable of operating over the entire battery voltage range of 0.8 to 1.6 volts per alkaline AA cell, which is 3.2V to 6.4V total with four alkaline AA cells. In some exemplary embodiments, it is also important to select a boost converter chip with high efficiency, and to enable this high efficiency by not burdening the circuit with lossy components in the power stream. Obviously many of the benefits of the present application can be had without such limitations, e.g., a circuit that functions down to 0.8-0.9 volts or 0.91-0.95 volts or even 0.96-1.0 volts per alkaline cell or more, i.e., 0.1-0.15 VDC or 0.16-0.2 VDC above end-of-life voltage (or 11-15% above end-of-life OCV or another end-of-life parameter or 16-20% above end-of-life OCV or another end-of-life parameter).

Figure 3:
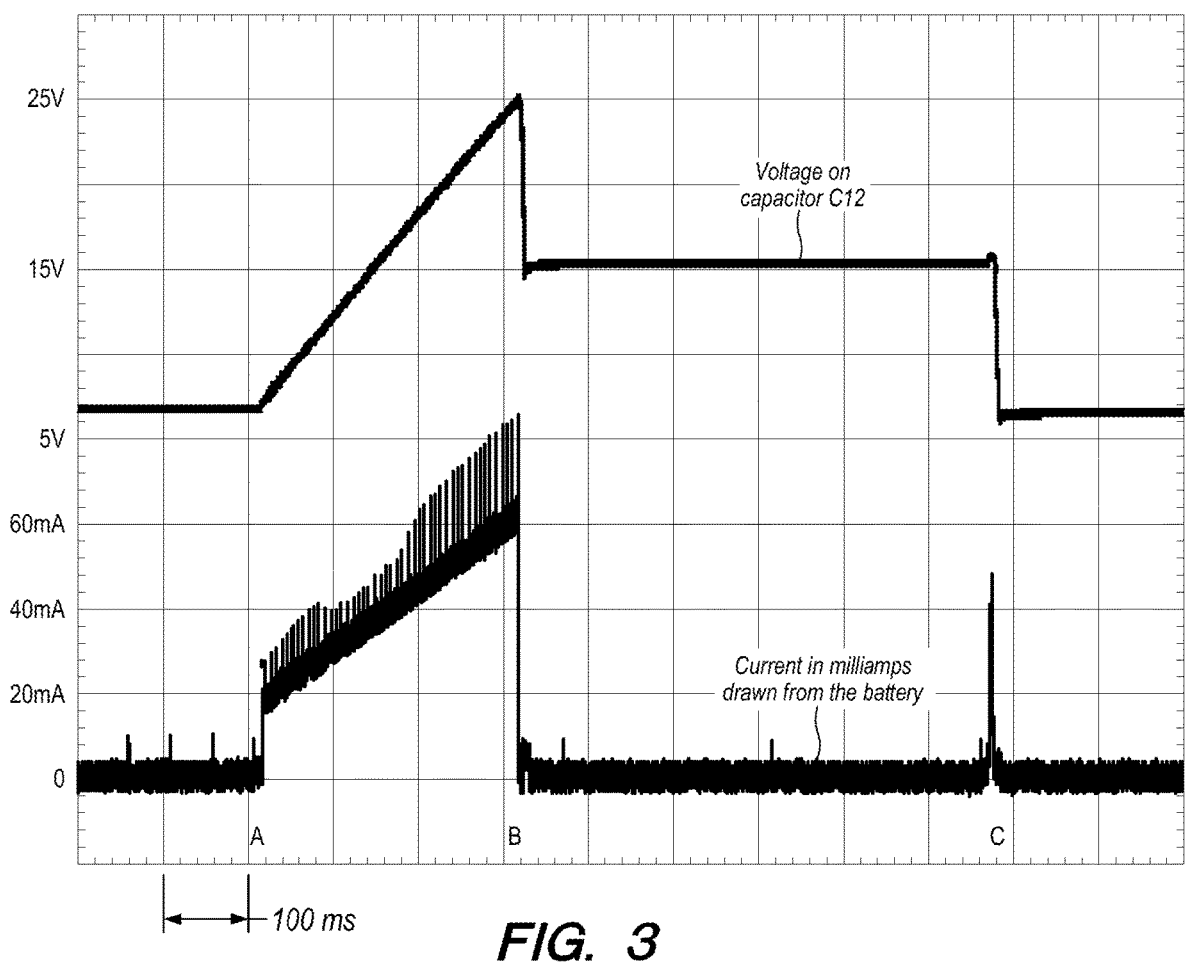
FIGS. 3-5 show waveforms from an implementation of the circuit of FIG. 2 (and FIGS. 6-7).

FIG. 3 shows electrical signals collected from an implementation of the circuit of FIG. 2 powered by a 6 VDC power supply, simulating four fully charged AA cells: the voltage on capacitor C12 and the current in milliamps drawn from the battery. In steady state, the circuit is drawing an average of about 17 μA idle current from the battery. The capacitor voltage is a little under 7 VDC to the right of point A. That voltage is due to residual charge on the capacitor after discharging to actuate the solenoid. If the capacitor were fully discharged, it would have a voltage of no lower than Vbatt minus a diode voltage drop (from diode D4 or Q8). At point A, the second control unit 14 causes the boost circuit to increase the voltage on the capacitor C12 from about 7 V to about 24 V (or some other voltage high enough to actuate the solenoid to open the valve), so the current drawn from the battery increases to about 20 mA initially and then steadily increases to about 60 mA as the voltage on the capacitor reaches 24 V. This takes about 300 ms in FIG. 3. This charge time is determined by the current drawn from the battery; charging the capacitor quicker drains the battery faster, which shortens its useful life. Waiting too long, however, e.g., 500 ms, will be detectable by the user and, perhaps frustrating, especially if the system is a manually triggered system, e.g., a manually triggered flush (the user will push the button, but the system doesn't respond). For example, a 15 mA draw when charging to a capacitor charge of 40 volts would take over two seconds, which might be acceptable for some systems (e.g., auto-detect flush systems) but completely unacceptable for other systems, e.g., manual systems. As another example, drawing 100 mA from the battery while charging up to as capacitor voltage of only 15 volts would take about 100 ms, but would lessen the battery life. If the residual charge on the capacitor is more than 6 or 7 V, e.g., 10 V, it can take less time, e.g., 50 ms, but maintaining a higher voltage on the capacitor will shorten the useful life of the batteries because storing higher voltage on the capacitor C12 will increase its leakage current. Thus, in some exemplary embodiments, the capacitor is charged (A-B in FIGS. 3-5) in 0.25-0.40 seconds. In other exemplary embodiments, the longer end of that range can go out to 0.5 seconds, or 0.75 seconds, or even a second. Similarly, in other exemplary embodiments, the shorter end of that range can be 50 ms or 100 ms or 200 ms seconds.

Once the voltage on capacitor C12 reaches 24 V, at point B, the capacitor C12 has sufficient stored energy to open the valve, so the second control unit 14 controls the H bridge 16 to actuate the solenoid S to open the valve, which leaves about 15 VDC on the capacitor. The voltage on the capacitor C12 only needs to be about 16 V to actuate the solenoid to close the valve, which state is seen to the right of point B between points B and C. In this state, the boost converter is off, the voltage on the capacitor C12 is at about 16 V (slowly decreasing due to leakage current), and the circuit is drawing an average of about 17 µA idle current from the battery. Once the second control unit 14 decides that it is time to close the valve, at point C, the second control unit 14 causes the boost converter to run briefly (to increase the voltage on capacitor C12 back up to 16 VDC from, e.g., 15 VDC) and then controls the H bridge 16 to actuate the solenoid S to close the valve, which drops the voltage on the capacitor back down to the residual value of about 7 VDC. The cycle can then repeat, with a voltage of about 7 VDC on the capacitor C12 and drawing an average of about 17 µA idle current from the battery, as before. This average of about 17 µA idle current drawn from the battery is not uniformly drawn. About half of the 17 µA idle current is a relatively large peak for a few hundred microseconds (one can see these in some of the figures as short, vertical spikes before point A in FIGS. 3-4) and about half of it is spread out over a few hundred milliseconds.

Figure 4:
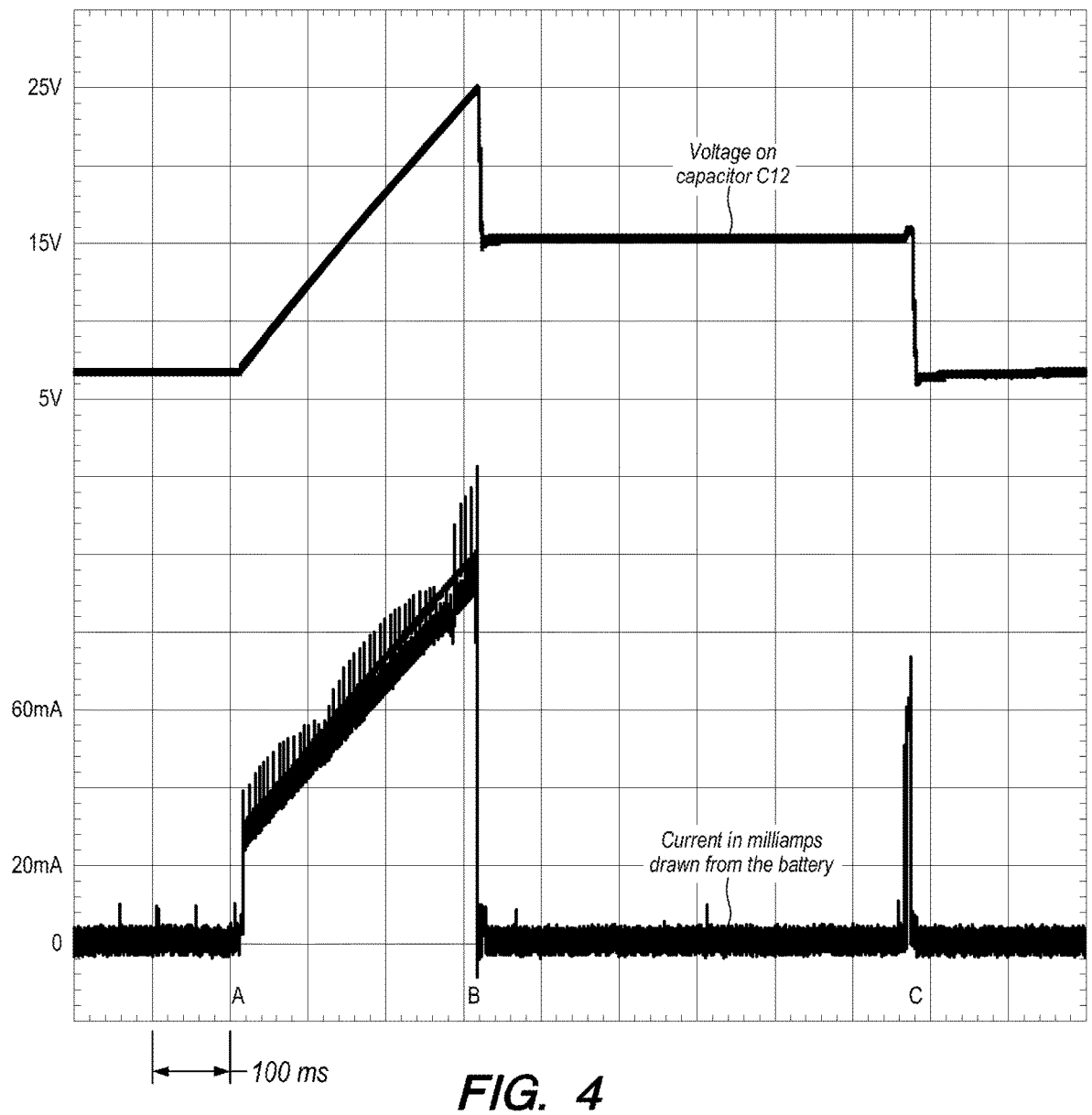

FIG. 4 is like FIG. 3 and shows electrical signals collected from an implementation of the circuit of FIG. 2 powered by a 4 VDC power supply, simulating four AA cells near end-of-life, each with a 1.0 V open circuit voltage. As in FIG. 3, the voltage on the capacitor C12: initially starts out with a residual voltage of nearly 7 VDC, then is boosted to about 24 VDC (then the solenoid is actuated, opening the valve), drops to about 15 VDC and stays at that level (then the solenoid is actuated, closing the valve), and drops to a little under 7 VDC and stays at that level (if there is no subsequent actuation, the voltage on the capacitor will slowly decrease to Vbatt minus a voltage drop because of leakage). As one can see, these waveforms are virtually identical to FIG. 3, except the circuit draws more current from the battery when increasing the voltage of the capacitor—the current drawn from the battery rises from about 20 mA to over 90 mA as the capacitor voltage is increased from about 7 V to 24 V (compared to a maximum of about 60 mA for the circuit of FIG. 3).

Figure 5:
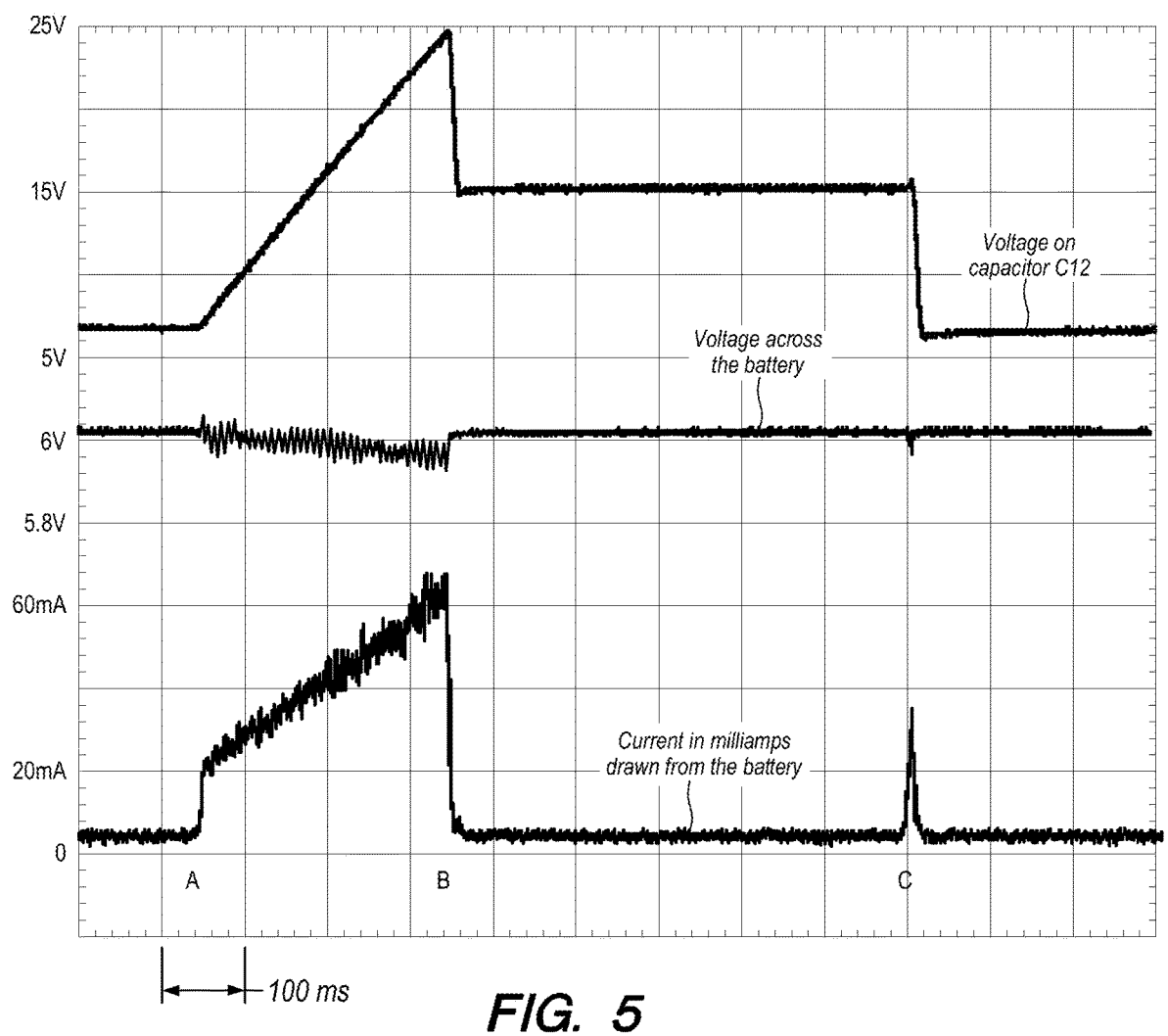

FIG. 5 is like FIGS. 3-4 and shows electrical signals collected from an implementation of the circuit of FIG. 2 powered by four fresh AA cells, each with a 1.5 VDC open circuit voltage (averaging was turned on to see the waveforms more clearly): the voltage on capacitor C12, the voltage across the battery (this is not shown in FIGS. 3-4 because the power supply voltage would not drop like a real battery would), and the current in milliamps drawn from the battery. As in FIGS. 3-4, the voltage on the capacitor C12: initially starts out with a residual voltage of nearly 7 VDC, then is boosted to about 24 VDC (then the solenoid is actuated, opening the valve), drops to about 15 VDC and stays at that level (then the solenoid is actuated, closing the valve), and drops to a little under 7 VDC and stays at that level (if there is no subsequent actuation, the voltage on the capacitor will slowly decrease to Vbatt minus a voltage drop because of leakage). As one can see, these waveforms are virtually identical to FIG. 3—the current drawn from the battery rises from about 20 mA to about 60 mA as the capacitor voltage is increased from about 7 V to 24 V. Notice that the battery voltage drops about 0.05 V from about 6.0 VDC to about 5.95 VDC while the capacitor voltage is increased from about 7 V to 24 V. In contrast, with AA cells near their end of life (1.0 VDC open circuit voltage), one would see a larger drop while the capacitor voltage is increased from about 7 V to 24 V, perhaps a drop from about 4 VDC down to about 3.5 VDC while about 90 mA is being drawn or a drop from about 3.5 VDC down to about 3 VDC while about 100 mA is being drawn (see FIG. 11 and accompanying text).

Figure 11:
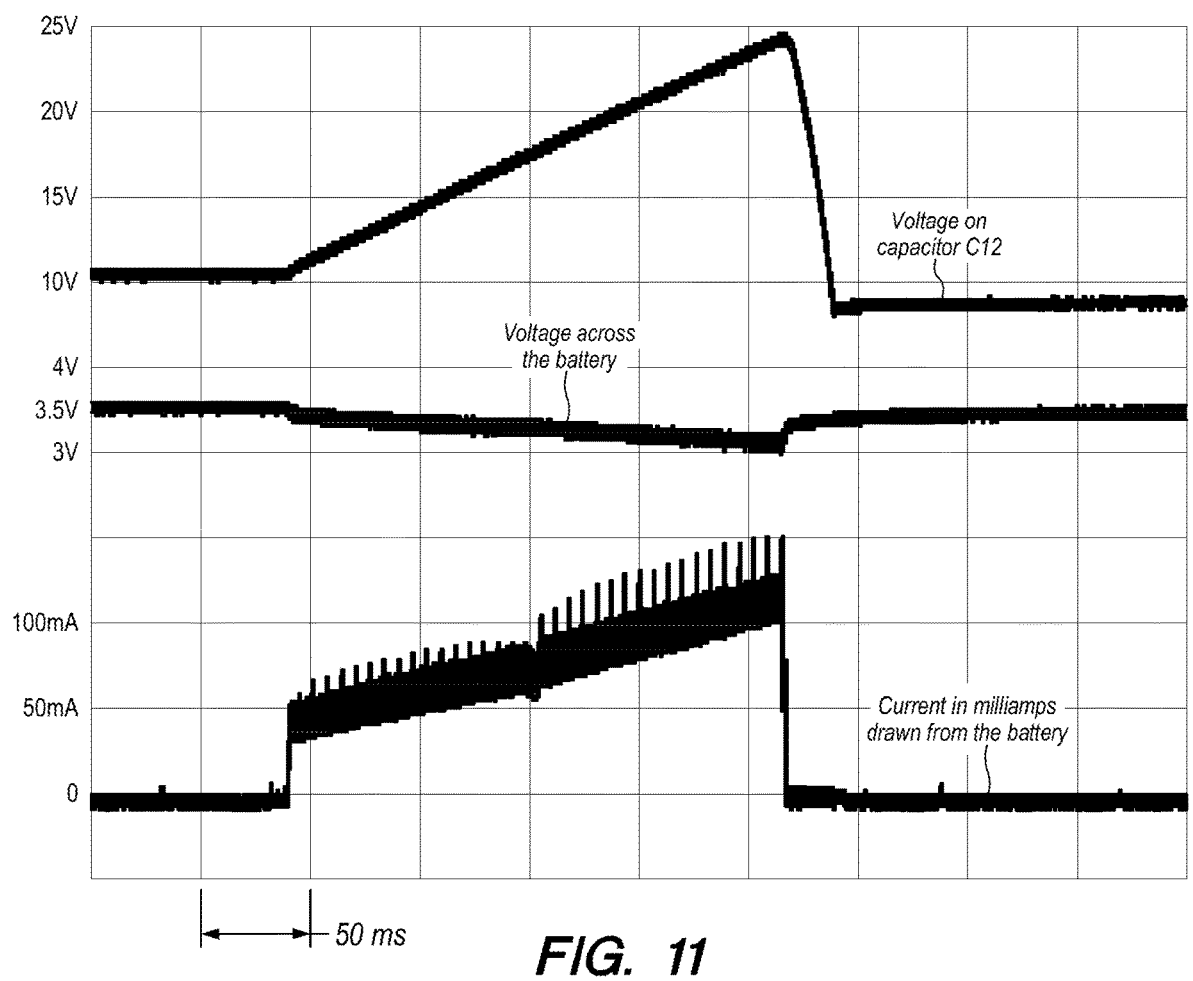
FIG. 11 shows waveforms from an implementation of the circuit of FIG. 2 (and FIGS. 6-7).

FIG. 11 is like FIGS. 3-5 and shows electrical signals collected from an implementation of the circuit of FIG. 2 powered by four AA cells near their end of life (averaging was turned on to see the waveforms more clearly): the voltage on capacitor C12, the voltage across the battery (this is not shown in FIGS. 3-4 because the power supply voltage would not drop like a real battery would), and the current in milliamps drawn from the battery. Here, the four batteries have an open circuit voltage of about 3.5 VDC, i.e., about 0.875 VDC each. When the boost converter begins operating to charge the capacitor (i.e., in FIG. 11 when the capacitor voltage begins ramping up), the battery voltage drops slightly and eventually the voltage of the batteries drops to just above 3.0 VDC while the circuit is operating to charge the capacitor (about 0.75 VDC for each battery). The boost converter circuit charges the capacitor up to about 24 volts, and then the circuit quickly discharges the capacitor energy into the solenoid. The current being drawn from the battery starts at about 50 mA when the circuit begins running (Vbatt is about 3.5 VDC) and ends at about 100 mA right before the capacitor discharges ($V_{batt}$ is about 3 VDC) and the charge circuit stops. The process takes about a quarter of a second to charge the boost capacitor from about 10 volts to about 24 volts. The battery voltage is lowest (about 3.0 VDC) and the current drawn from the batteries is highest (about 100 mA) right before the capacitor discharges. In this example, the solenoid is not installed in a valve, the plunger is not moving, and the autodetect circuit is not active, which represents a worst-case energy use situation.

Table 1 shows average current and peak current for the circuit of FIG. 2 in the standby state (capacitor C12 at about 6 V) and during a single activation of the valve (open, pause, and close) with the battery (the four AA cells) in various states of discharge. This exemplary system presents a low battery warning when the battery voltage drops to 3.8 VDC (each AA cell is at about 0.95 VDC) and will not activate when the battery voltage drops to 3.16 VDC (each AA cell is at about 0.79 VDC, just under its end-of-life voltage). The exemplary system will continue to function down to a battery voltage of 3.2 VDC (each AA cell is at about 0.8 VDC).

TABLE 1

| | Standby | | Single activation | | | |
|---|---|---|---|---|---|---|
| Volts | Peak mA | Avg Ma | Peak mA | Avg mA | Seconds | |
| 6.8 | 7.67 | 0.0163 | 4.1 | 2.61 | 2.12 | |
| 6.4 | 7.67 | 0.0160 | 39.6 | 2.65 | 2.12 | |
| 6.0 | 7.73 | 0.160 | 50.2 | 2.92 | 2.12 | Nom |
| 5.6 | 7.69 | 0.160 | 56.5 | 3.10 | 2.12 | |
| 5.2 | 7.66 | 0.0159 | 50.1 | 3.36 | 2.12 | |
| 4.8 | 7.61 | 0.0157 | 68.8 | 3.62 | 2.12 | MLV |
| 4.4 | 7.69 | 0.0157 | 58.6 | 3.94 | 2.12 | |
| 4.0 | 7.68 | 0.0159 | 66.7 | 4.30 | 2.12 | |
| 3.8 | 7.65* | 0.0155* | 76.9* | 4.53* | 2.12* | LB FEP |
| 3.6 | 7.66 | 0.0155 | 73.6 | 4.78 | 2.12 | LB |
| 3.2 | 7.06 | 0.0753 | 89.3 | 5.72 | 2.12 | LB |
| 2.8 | 1.53 | 0.100 | Won't activate at 3.1 V | | | |
| 2.4 | 0.92 | 0.005 | | | | |
| 2.0 | .079 | 0.004 | | | | |

FEP at 3.8 V (0.95 V/cell)
Tested with Agilent N67058
Low battery (LB) red LED on at 3.8 V
Average standby = 16 uA
RCP (Stdby) = 0.139 CC, .02 mW, .016 mA, 76.5 Kohm
RCP (ON) = .94 CP, 4.4 mW, 3.6 mA, 338 ohm
Recommended usage pattern = 130 activations per day
Nominal = 1.5 V/cell
Midlife = 1.22 V/cell
FEP = 0.95 V/Cell Service estimates for the circuit of FIGS. 1-2 powered by ENERGIZER MAX brand model E91 Alkaline AA cells is about 9.5 years (about 450,000 activations), based on 130 activations per day of a solenoid flush valve (without water), including the activation pulse (points A-C in FIGS. 3-5) and background drain. Thus, exemplary embodiments herein are capable of powering a solenoid flush valve for 5-9.5 years or 6-9.5 years or 7-9.5 years or 8-9.5 years when powered by four Alkaline Zinc-Manganese Dioxide (Zn/MnO2) AA cells. Service estimates for that circuit powered by ENERGIZER ULTIMATE brand model Lithium/Iron Disulfide (Li/FeS2) AA cells is about 12 years (about 570,000 activations), based on 130 activations per day of that valve (without water), including the activation pulse (points A-C in FIGS. 3-5) and background drain. Thus, exemplary embodiments herein are capable of powering a solenoid flush valve for 7-12 years or 8-12 years or 9-12 years or 10-12 years when powered by four Lithium/Iron Disulfide (Li/FeS2) AA cells.

Figure 6:
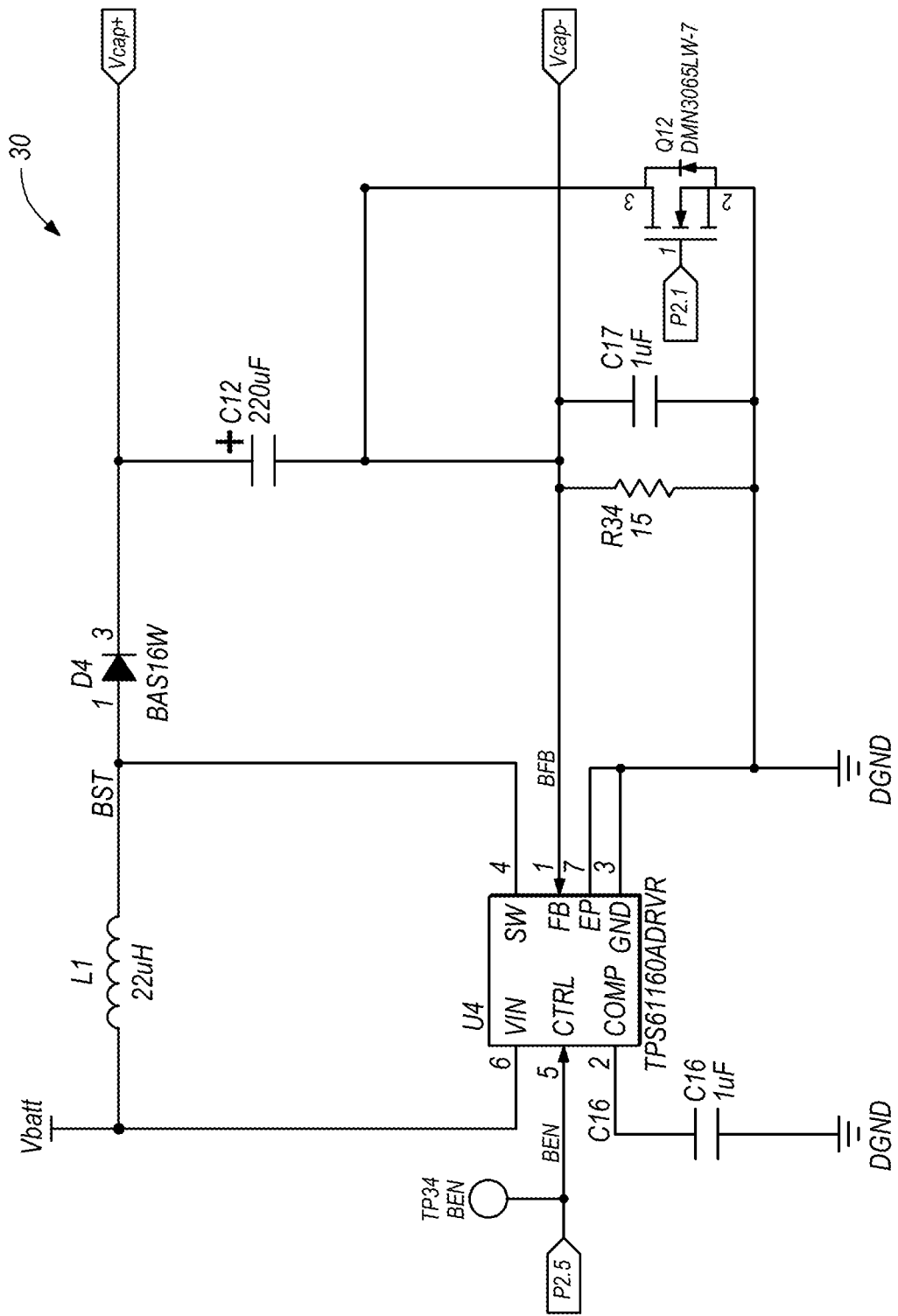
FIG. 6 is a schematic block diagram of yet another exemplary electronic battery circuit.

Referring now to FIG. 6, this figure shows an exemplary circuit 30 that is a modification of the circuit of FIGS. 1-2 that can be used to also power a motor, e.g., a motor in a soap pump. In some exemplary embodiments, the boost converter is not used when the circuit is driving a higher current motor, such as a soap pump, over a relatively long dispense cycle, e.g., 4.5 volts at 100-500 mA for 2-4 seconds. The energy-per-cycle of such a soap pump is around 2-3 Joules, far more than can be stored in the capacitor C12 in the circuits of FIGS. 1-2. Also, the boost converter can supply only a fraction of the current needed to operate the pump. Considering a time axis, the boost converter of FIGS. 1-2 is good at time-stretching a 20-msec operation at high current (i.e., actuating the solenoid S) up to a few hundred msec of battery drain at lower current (as discussed above). However, the soap dispenser already takes up to 4 seconds to operate. Accordingly, the boost converter is bypassed for a soap pump application. Additionally, if the boost converter circuit is also going to be used for a higher current application, such as a soap pump, the BAS16 W diode (mentioned above) must be replaced with a different diode that handles more current (such a soap pump pulls more current than the BAS16 W diode is rated to handle), such as a DMN3065LW-7 MOSFET wired as a diode (e.g., Q8 in FIG. 7A).

As with FIGS. 1-2, the battery in FIG. 6 is directly connected to the inductor L1 (as defined above). Pin P2.5 of second control unit 14 turns off the power supply circuit U4 (a TI TPS61160) when the circuit is used to drive a soap pump. The second control unit 14 also controls a driver circuit electrically connected to Vcap+ and Vcap−. If one tries to run such a soap pump with the circuit of FIGS. 1-2, the 15-ohm feedback resistor R34 would burn up. Accordingly, while running a soap pump, the second control unit 14 turns on Q12, which bypasses the 15-ohm resistor R34 so that the battery can connect to and power the motor for the soap pump (the boost circuit would not be running).

Figure 7A:
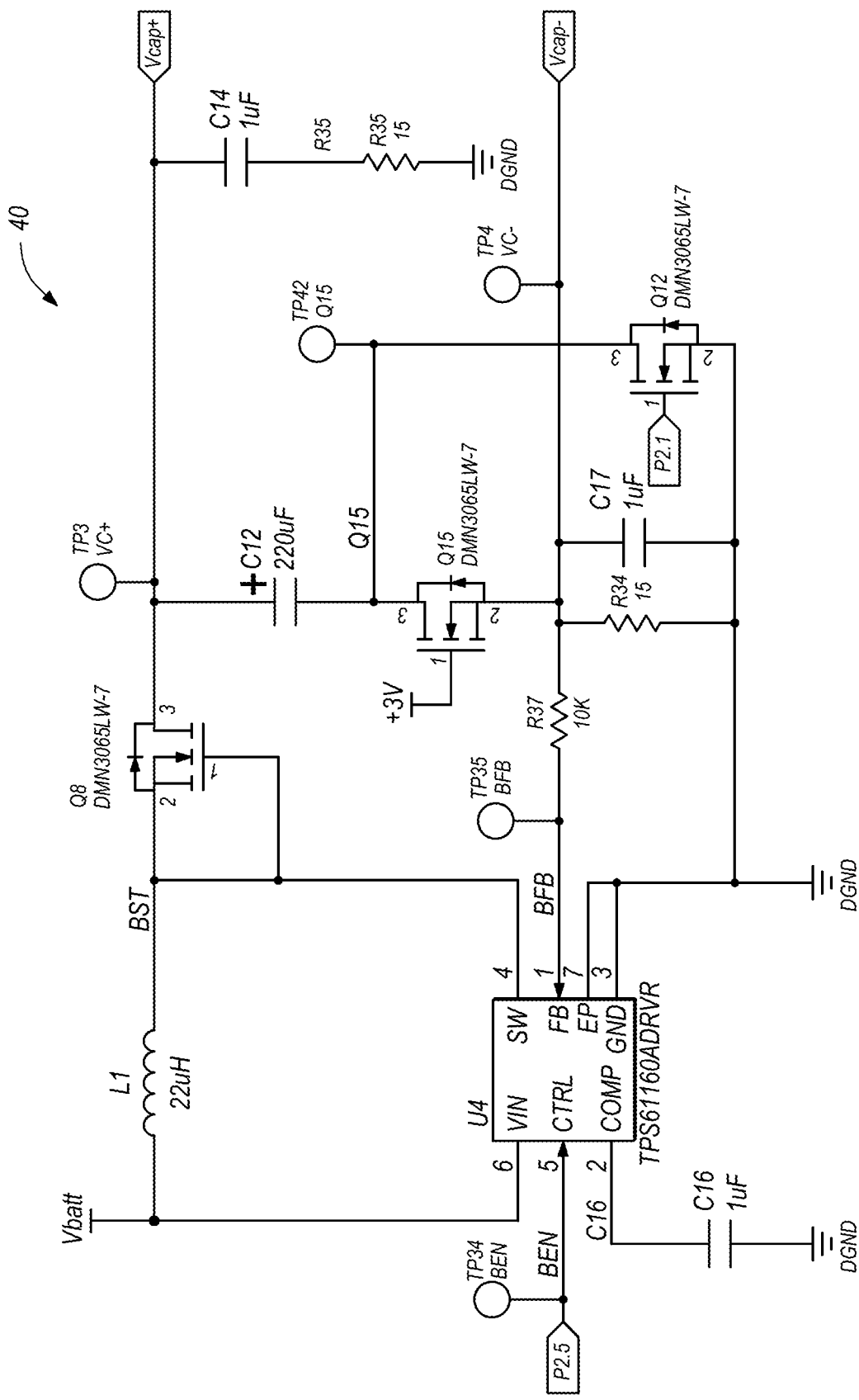
FIGS. 7A-7B are schematic block diagrams of still another exemplary electronic battery circuit.
Figure 7B:
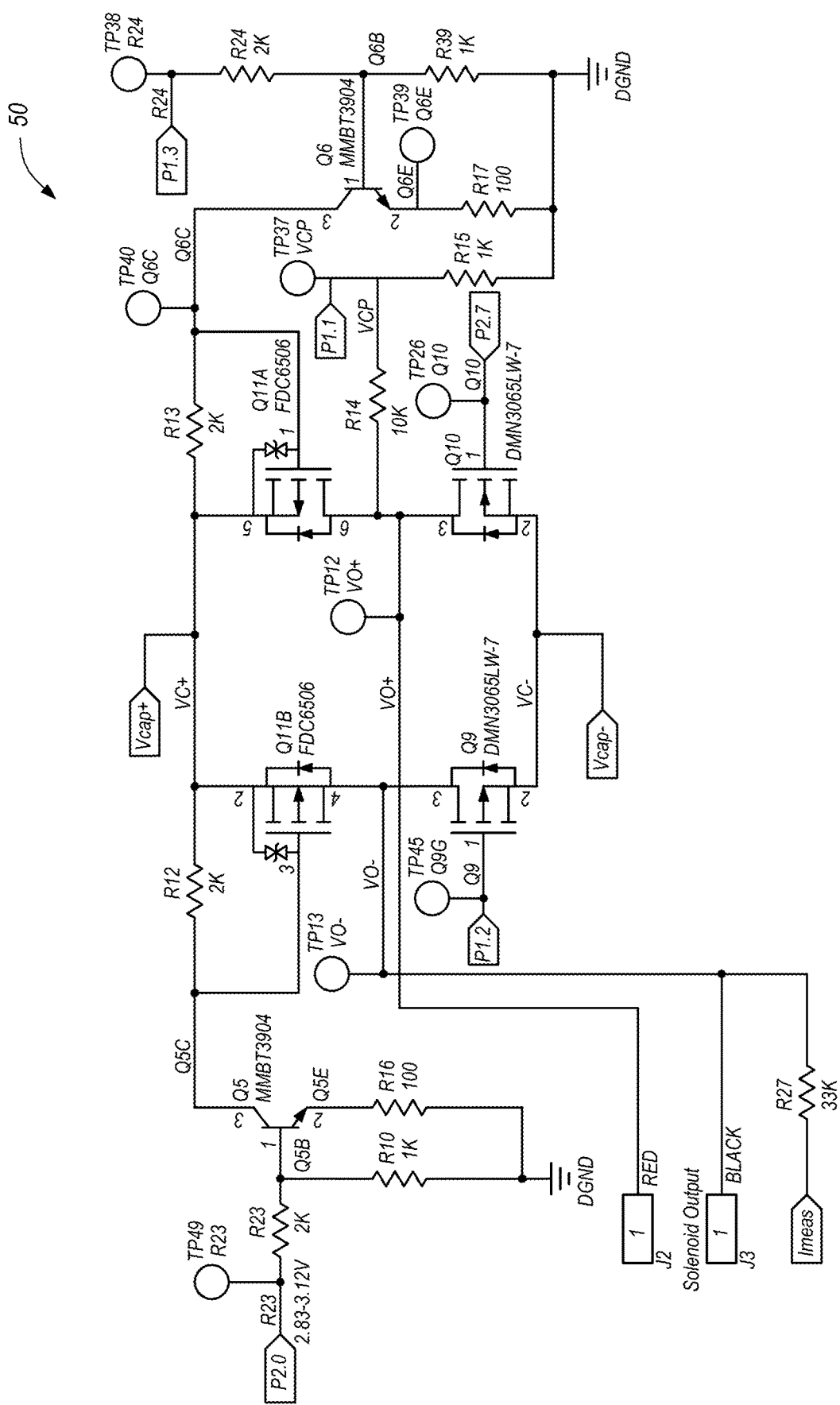

Referring now to FIGS. 7A-7B, these figures shows an exemplary circuit 40 that is a portion of a commercial implementation of the circuit of FIG. 6. In FIG. 7A, transistor Q15, capacitor C14, and resistors R35, R37 are protection components. Without them, on first power-up, Vcap− goes to +12V, possibly damaging U4 and the H-bridge FETs. Clamping Vcap− results in very large currents. Q15 solves this by limiting Vcap− to 3-Vth, except, the drain can become high-impedance and energy in L1 can possibly damage U4. C14 and R35 provide a place for L1's energy to go. Without R35, the circuit becomes an oscillator. Unfortunately, R35 allows ripple on the FB pin, so capacitor C17 is added to reduce ripple. C17 causes Q15 to be ON during initial power-up. The gate of Q15 cannot be driven with a processor pin because it would need an external pulldown R, which wastes energy, e.g., before the firmware has booted. Current through L1, D4, C12, Q15, R34=(3V-Vth)/R34 at startup. Transistor Q15 is fully on during normal operation. In these various embodiments, the current into C12=0.2/R34 while boosting. After turning off high-side FETs in the H-bridge, Vcap+ increases a few mV, but C14 makes this happen slowly. The system waits a few time constants (R10+R34) before taking current measurement for autodetect. In this embodiment, C14 and C12 are rated at 35V, the H-bridge is rated at 30V, and U4 stops boosting at 26V.

FIG. 7B shows an exemplary circuit 50 including an H-bridge formed by FETs Q9, Q10, and Q11A-Q11B that actuates the solenoid responsive to control of the processor (e.g., pins of the MSP430). As shown in that figure, the solenoid is actuated (ON, i.e., moved to open the valve) when the processor outputs at pins P1.2 and P1.3 a voltage associated with a digital signal being ON (and pins P2.0 and P2.7 are low or OFF) and the solenoid is turned OFF when the processor outputs at pins P2.0 and P2.7 a voltage associated with a digital signal being ON (and pins P1.2 and P1.3 are low or OFF). The circuit formed by processor pin P2.0, transistor Q5, and resistors R10, R16, and R23 is a current source that permits the H-Bridge to function over a range of 4-30 VDC at relatively low cost. The voltage across capacitor C12 is measured at processor pin P1.1 when Q11A is ON. Resistors R14 and R15 form a divide by 11 voltage divider.

Some exemplary embodiments have a means for detecting a person or other object proximate the solenoid or motor being powered by the circuit, such as one or more sensors in circuit communication with the first control unit 12 and/or the second control unit 14, e.g., a passive IR detector or an active IR detector (IR transmitter/receiver pair) aimed at a space where a person using the device would be expected to be, a camera, a physical switch, etc. In such embodiments, the first control unit 12 and/or the second control unit 14 have code stored in memory to implement the sensor and determine when to begin charging the capacitor C, C12 (e.g., point A in FIGS. 3-5), when to actuate the solenoid to open the valve using power stored in the capacitor (e.g., point B in FIGS. 3-5), and when to actuate the solenoid again to close the valve (e.g., point C in FIGS. 3-5), if at all. FIGS. 3-5 are for exemplary faucet embodiments (e.g., detect a hand, open the valve, stop detecting a hand, close the valve). In exemplary flush valve embodiments, the waveforms would be virtually identical, except the timing between point B and point C would be longer.

Figure 8A:
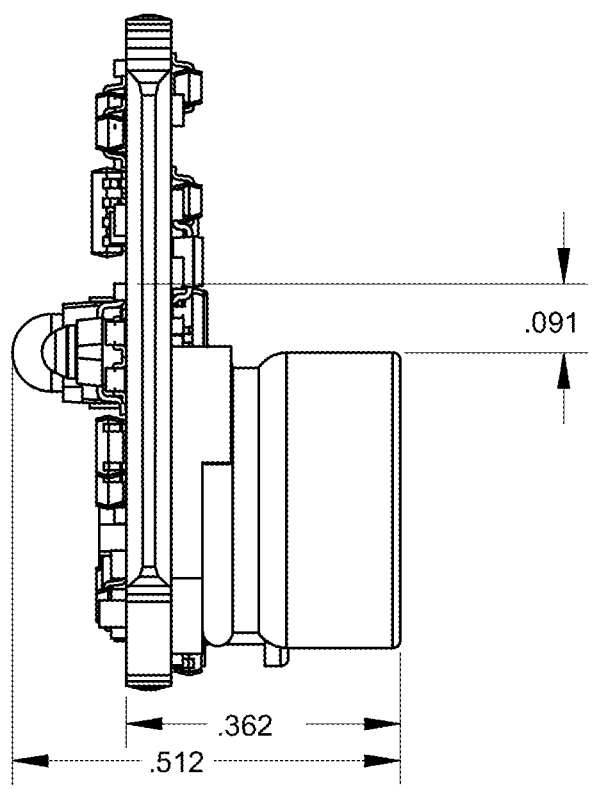
FIGS. 8A-8B shows various views of an implementation of the circuit of FIGS. 7A-7B.
Figure 8B:
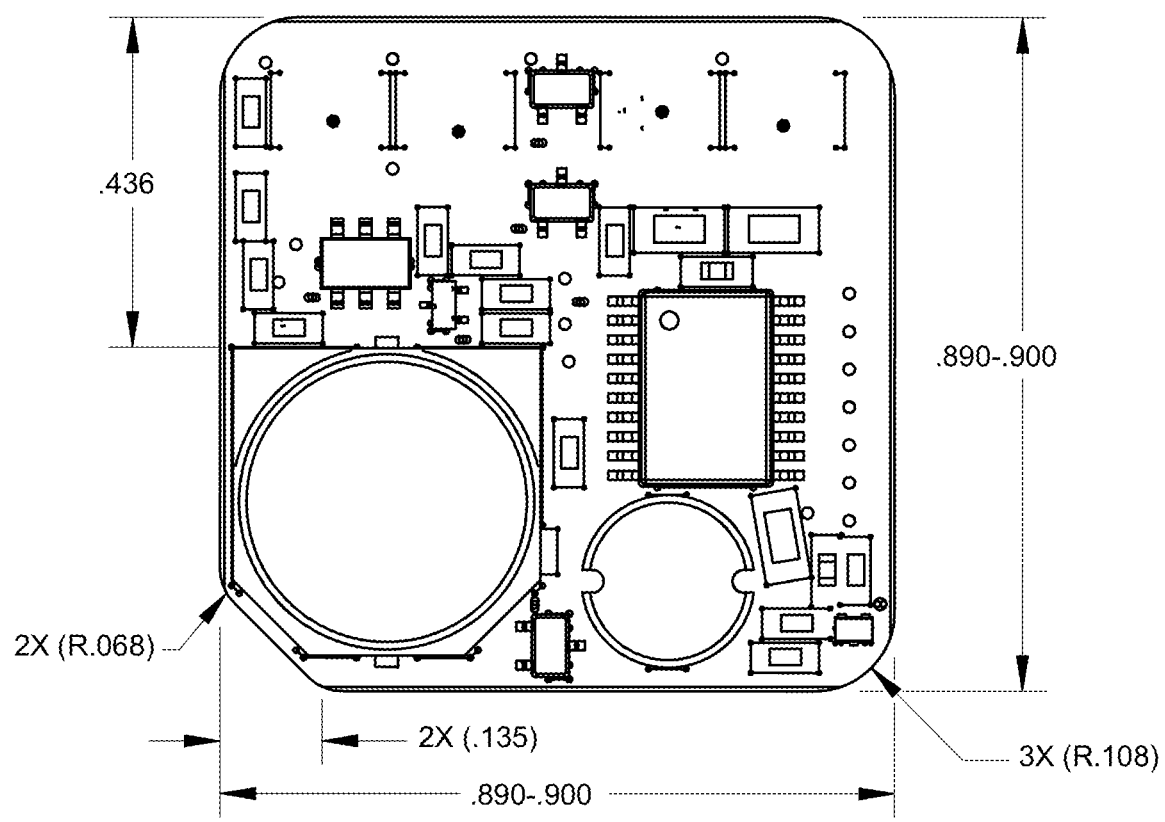

FIGS. 8A-8B show various views of an exemplary circuit implementation of the boost circuit of FIGS. 7A-7B. In exemplary embodiments, the circuit has a volumetric envelope (defined as rectangular 3D solid around the circuit), excluding the battery and wiring to the battery, in a range of 3-10 or 2½-12 cubic centimeters. The particular circuit has a volumetric envelope of about 0.3 cubic inches, i.e., about 4.9 cm$^3$ (excluding the height of the IR transceiver) and about 0.4 cubic inches, i.e., about 6½ cm$^3$ (including the height of the IR transceiver). The volumetric envelope of the circuit is actually closer to about 2½ cm$^3$ if the volumetric envelope of the board (about 2 cm$^3$) and capacitor (about 0.6 cm$^3$) are calculated separately.

Figure 9:
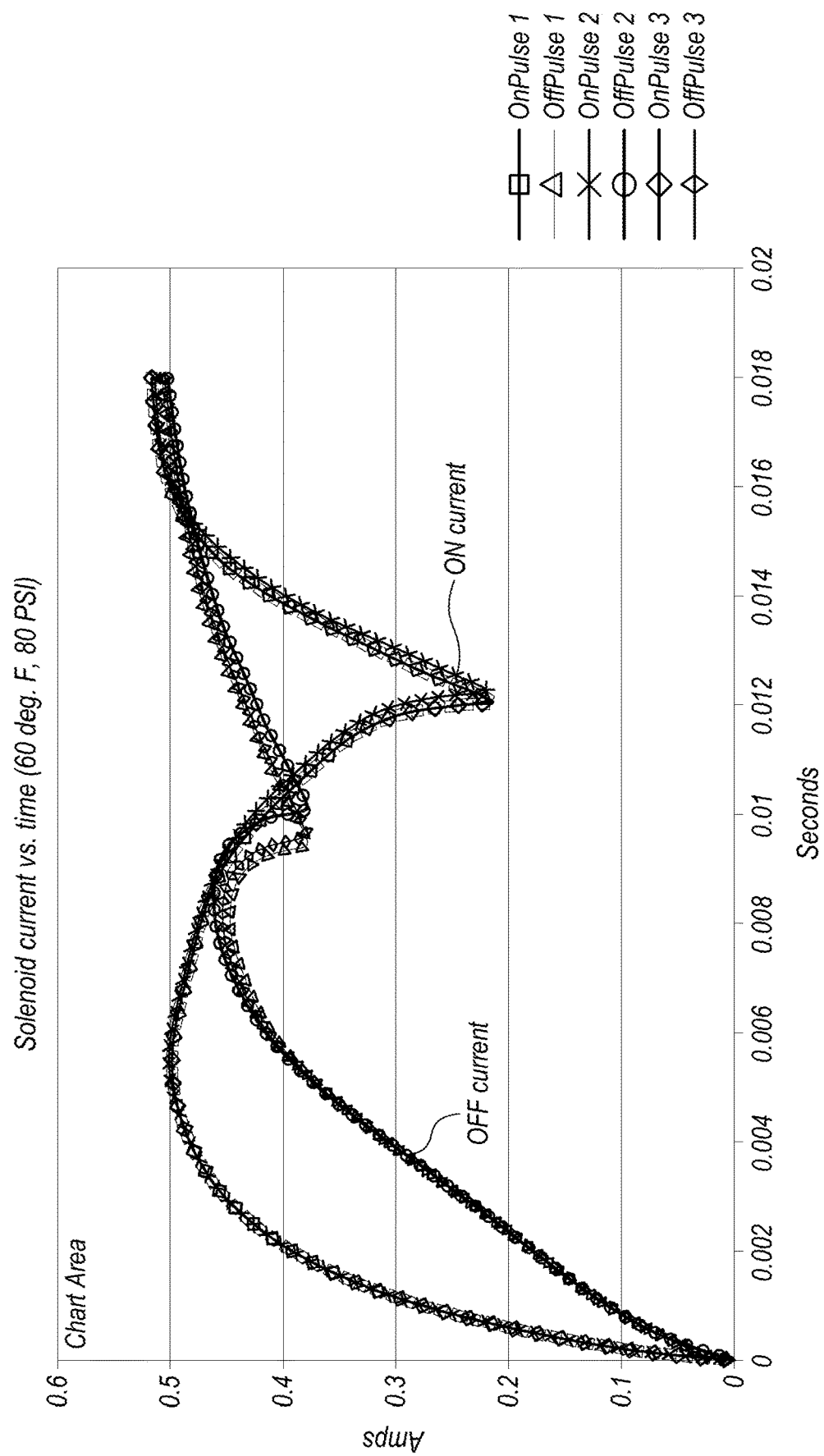
FIG. 9 shows several plots of solenoid current over time as a solenoid is opened and closed three times.

In some exemplary embodiments, the solenoid is driven for a specific period of time to ensure that the valve is opened. In other exemplary embodiments, a signal of the solenoid driving circuit is monitored by the processor to determine when the valve has opened or closed, permitting the processor to turn off the solenoid driving circuit to conserve additional battery power. With this particular solenoid-powered valve, a solenoid-driven plunger moves to open and close the valve. The plunger has a permanent magnet. Accordingly, once the plunger is open, it stays open, and once the plunger has closed, it stays closed. An electromagnet pushes or pulls the plunger. Because the plunger stays in its position, only a brief energy impulse is needed to open or close the valve. FIG. 9 shows several plots of solenoid current over time as the solenoid described above is opened and closed three times. Notice that in all six instances, current rises, then gradually turns downward, then sharply rises creating a local minimum because when the plunger stops moving it ceases creating back EMF. The local V-shaped minima in FIG. 9 correspond to the time when the plunger stops moving, thus indicating when the processor circuit can turn off the solenoid driving circuit. Continuing to drive the solenoid past the local minimum wastes energy because the plunger has traveled as far as it can and thus the electrical power is simply generating a magnetic field that accomplishes nothing and generates wasted heat because current is flowing through the solenoid, which has an electrical resistance. Accordingly, in exemplary embodiments, the current of the solenoid driving circuit is monitored by the processor to determine when the valve has opened or closed, permitting the processor to turn off the solenoid driving circuit to conserve additional battery power. In some exemplary embodiments, the following algorithm is used by the processor to detect a true local minimum indicating that the plunger has stopped moving (as compared to a very short minimum, which can be caused by noise on the signal): analyze the slope of the current waveform (e.g., by taking the derivative and heavily filtering it) to look for the different states in FIG. 9, such as positive slope, then zero slope, then negative slope, then positive slope again. In some exemplary embodiments, the following is used: sample current every 256 µs, track peak current, wait for measured current to be 4 mA less than peak current for five samples in a row, then track minimum current, wait until measured current is 4 mA greater than the minimum current for three samples in a row, then turn off the solenoid drive. The waveforms in FIG. 9 are relevant to a plumbing system wherein the static water pressure is 80 PSI. The exemplary circuit shown can also drive the solenoid to open under higher pressures, e.g., 125 PSI. For higher pressures, the local minimum will be shifted to the right, i.e., it takes longer to open the valve. For lower pressures, the local minimum will be shifted to the left, i.e., it takes a shorter time to open the valve.

Figure 10:
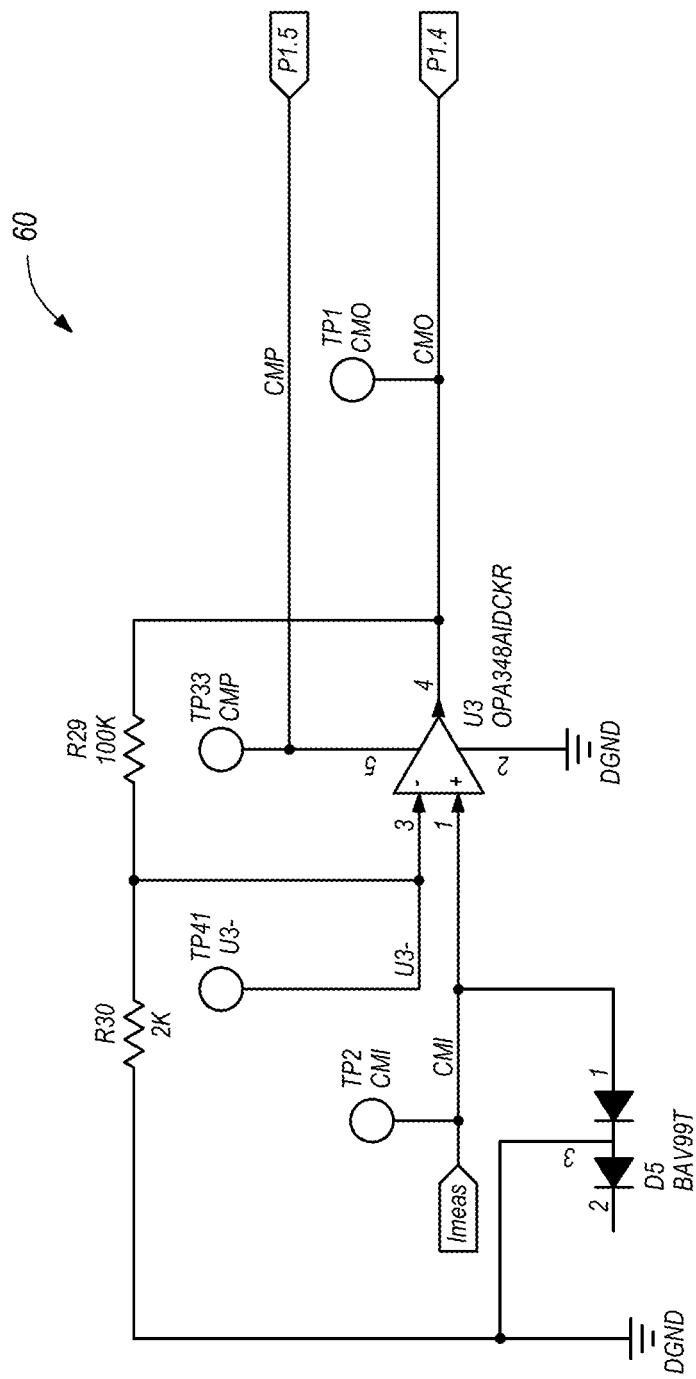
FIG. 10 is a schematic diagram showing an exemplary circuit for generating a signal proportional to solenoid current.

Referring now to FIG. 10, an exemplary amplifier circuit 60 is shown. This circuit 60 permits the processor to detect when the solenoid plunger has stopped moving. The internal resistance of FET Q9 in FIG. 7B is used to form a voltage at Imeas proportional to the solenoid current. The signal Imeas in FIG. 10 is from FIG. 7B and is connected to the solenoid via a 33K ohm resistor R27. The circuit in FIG. 10 is basically an amplifier to amplify Imeas. Because the derivative of the digitized current signal is taken, offsets to the current are unimportant. Pin P1.5 of the MSP430 processor powers the opamp U3 and controls when opamp U3 outputs a signal at P1.4 proportional to the solenoid current that is sent to processor pin P1.4. Processor pin P1.4 is an analog input; the processor determines a digital value proportional to the solenoid current that is used by the processor to find a local minimum in solenoid current (discussed above) to determine when the valve has opened or closed, permitting the processor to turn off the solenoid driving circuit to conserve additional battery power.

Some of the steps, acts, and other processes and portions of processes are described herein as being done "automatically." In the alternative, or in addition thereto, those steps, acts, and other processes and portions of processes can be done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the circuits herein can be modified with any one or any two or more of the following: precharging the capacitor to 24V during periods of heavy usage, supplementing the capacitor's stored charge with battery power by running the boost converter while activating the solenoid, upgrading the H-bridge to a suitable driver for a different type of load, measuring the current waveform while driving the valve and modifying the voltage profile driven to it, and/or using the inductance of the solenoid or valve as part of the boost converter circuit. As another example, although much of the above text describes the various circuits in the context of AA cells, the claims are not intended to be limited to any specific battery designation (unless a specific battery designation is expressly claimed); much of the above will apply to alkaline AAA cells and other battery designations, e.g., although not tested, it is believed that two CR2032 lithium "coin" cells will function in the circuits shown and described herein for one year under the circumstances described herein. As still another example, the steps of all processes and methods herein can be performed in any order, unless two or more steps are expressly stated as being performed in a particular order, or certain steps inherently require a particular order. Accordingly, departures may be made from such details without departing from the spirit or scope of the applicant's general inventive concept.

What is claimed is:

1. A circuit providing electrical power to drive a solenoid-actuated valve from a battery, comprising:
   a capacitor in electrical communication with the solenoid;
   an electrically controlled switch having at least a first state and a second state;
   an inductor receiving electrical energy from the battery when the switch is in the first state, and releasing energy into the capacitor via a diode when the switch is in the second state;
   a first control unit configured to controllably change the switch between its first and second states to controllably charge the capacitor to a voltage of about 15-40 volts DC with electrical energy from the battery, the first control unit controlling the switch to draw about 15 mA to about 100 mA from the battery while charging the capacitor;
   a second control unit configured to controllably release energy stored in the capacitor to the solenoid to change the valve state; and
   wherein the circuit is powered by batteries having an open circuit voltage of 0.8-1.0 VDC when providing current in the range of 15-100 mA while charging the capacitor to actuate the solenoid; and
   wherein the circuit is capable of opening a solenoid requiring 45 millijoules to open at 80 PSI or at 125 PSI 130 times per day for a period of 9.5 years from manufacture of the batteries when powered by four AA 1.5 VDC alkaline dry cells.

2. The circuit providing electrical power to drive a solenoid-actuated valve from a battery, according to claim 1, wherein the first control unit comprises a boost converter control circuit and wherein the second control unit comprises a pre-programmed processor.

3. The circuit providing electrical power to drive a solenoid-actuated valve from a battery, according to claim 1, wherein there is no diode between the battery and the inductor, which permits the circuit to be powered by three to five dead or nearly dead AA or AAA dry cell alkaline batteries or three to five dead or nearly dead lithium AA or AAA batteries.

4. The circuit providing electrical power to drive a solenoid-actuated valve from a battery, according to claim 1, wherein there is no diode or other lossy components between the battery and the inductor, which permits the circuit to be powered by three to five dead or nearly dead AA or AAA dry cell alkaline batteries or three to five dead or nearly dead lithium AA or AAA batteries when providing current in the range of 15-100 mA while charging the capacitor to actuate the solenoid.

5. The circuit providing electrical power to drive a solenoid-actuated valve from a battery, according to claim 1, wherein the second control unit is programmed to control whether or not the first control unit charges the capacitor with electrical energy from the battery and wherein the second control unit is programmed to prevent the first control unit from charging the capacitor with electrical energy from the battery while energy stored in the capacitor is being released to the solenoid to change the valve state.

6. The circuit providing electrical power to drive a solenoid-actuated valve from a battery, according to claim 1, wherein the at least one capacitor has a collective capacitance in the range of 47 to 470 µF and has a collective volume in the range of 0.3 to 7 cubic centimeters.

7. The circuit providing electrical power to drive a solenoid-actuated valve from a battery, according to claim 1, wherein the circuit is powered by three to five AA dry cell alkaline batteries having an open circuit voltage of 0.8-1.0 VDC when providing current in the range of 15-100 mA while charging the capacitor to actuate the solenoid.

8. The circuit providing electrical power to drive a solenoid-actuated valve from a battery, according to claim 1, wherein the capacitor has a capacitance of about 220 µF.

9. The circuit providing electrical power to drive a solenoid-actuated valve from a battery, according to claim 1, wherein the circuit (PCB and components) has a volumetric envelope, excluding the battery and wiring to the battery, in a range of 3-10 cubic centimeters or 3-12 cc or 2 to 20 cc.

10. The circuit providing electrical power to drive a solenoid-actuated valve from a battery, according to claim 1, wherein the circuit, while charging the capacitor with electrical energy from the battery has an efficiency of transfer from the battery to the capacitor in the range of 80-97% without regard to circuit volume or 80-86% with a volume of 2-20 cc.

11. The circuit providing electrical power to drive a solenoid-actuated valve from a battery, according to claim 1, wherein the first control unit controls the switch to draw about 15 mA to about 100 mA from the battery while charging the capacitor.

12. The circuit providing electrical power to drive a solenoid-actuated valve from a battery, according to claim 1, wherein the first control unit controls the switch to draw about 15 mA to about 60 mA from the battery while charging the capacitor.

13. The circuit providing electrical power to drive a solenoid-actuated valve from a battery, according to claim 1, wherein the capacitor voltage is increased to drive the solenoid in 0.25-0.40 seconds.

14. The circuit providing electrical power to drive a solenoid-actuated valve from a battery, according to claim 1, wherein the circuit is capable of opening a solenoid requiring 20-60 millijoules to open.

15. The circuit providing electrical power to drive a solenoid-actuated valve from a battery, according to claim 1, wherein the circuit is capable of opening a solenoid characterized as follows: 10-20 mH, opening when driven by 500 mA at 5.2 VDC.

16. The circuit providing electrical power to drive a solenoid-actuated valve from a battery, according to claim 1, wherein the circuit monitors solenoid current and detects when the plunger has stopped moving by detecting a local minimum in solenoid current and does one or both of the following in response to detecting that the plunger has stopped moving: (a) stops providing current to the solenoid and (b) stops charging the capacitor from the battery.

17. The circuit providing electrical power to drive a solenoid-actuated valve from a battery, according to claim 1:
wherein the second control unit is programmed to control whether or not the first control unit charges the capacitor with electrical energy from the battery and wherein the second control unit is programmed to prevent the first control unit from charging the capacitor with electrical energy from the battery while energy stored in the capacitor is being released to the solenoid to change the valve state;
wherein the at least one capacitor has a collective capacitance in the range of 47 to 470 µF and has a collective volume in the range of 0.3 to 7 cubic centimeters;
wherein the circuit is powered by three to five AA dry cell alkaline batteries having an open circuit voltage of 0.8-1.0 VDC when providing current in the range of 15-100 mA while charging the capacitor to actuate the solenoid;
wherein the circuit (PCB and components) has a volumetric envelope, excluding the battery and wiring to the battery, in a range of 2-20 cubic centimeters;
wherein the circuit, while charging the capacitor with electrical energy from the battery has an efficiency of transfer from the battery to the capacitor in the range of 80-97% without regard to circuit volume or 80-86% with a volume of 2-20 cubic centimeters; and
wherein the capacitor voltage is increased to drive the solenoid in 0.25-0.40 seconds.

18. The circuit providing electrical power to drive a solenoid-actuated valve from a battery, according to claim 1:
wherein the circuit is capable of opening a solenoid requiring 45 millijoules to open at 80 PSI or at 125 PSI 130 times per day for a period of 9.5 years from manufacture of the batteries when powered by four AA 1.5 VDC alkaline dry cells;
wherein the circuit is capable of opening a solenoid characterized as follows—10-20 mH, opening when driven by 500 mA at 5.2 VDC—for 9.5 years from manufacture of the batteries when powered by four AA 1.5 VDC alkaline dry cells; and
wherein the circuit monitors solenoid current and detects when the plunger has stopped moving by detecting a local minimum in solenoid current and does one or both of the following in response to detecting that the plunger has stopped moving: (a) stops providing current to the solenoid and (b) stops charging the capacitor from the battery.

19. A circuit providing electrical power to drive a solenoid-actuated valve from a battery, comprising:
a capacitor in electrical communication with the solenoid;
an electrically controlled switch having at least a first state and a second state;
an inductor receiving electrical energy from the battery when the switch is in the first state, and releasing energy into the capacitor via a diode when the switch is in the second state;
a first control unit configured to controllably change the switch between its first and second states to controllably charge the capacitor to a voltage of about 15-40 volts DC with electrical energy from the battery, the first control unit controlling the switch to draw about 15 mA to about 100 mA from the battery while charging the capacitor;
a second control unit configured to controllably release energy stored in the capacitor to the solenoid to change the valve state; and
wherein the circuit is powered by three to five AA dry cell alkaline batteries having an open circuit voltage of 0.8-1.0 VDC when providing current in the range of 15-100 mA while charging the capacitor to actuate the solenoid; and
wherein the circuit is capable of opening a solenoid requiring 45 millijoules to open at 80 PSI or at 125 PSI 130 times per day for a period of 9.5 years from manufacture of the batteries when powered by four AA 1.5 VDC alkaline dry cells.

20. A circuit providing electrical power to drive a solenoid-actuated valve from a battery, comprising:
a capacitor in electrical communication with the solenoid;
an electrically controlled switch having at least a first state and a second state;
an inductor receiving electrical energy from the battery when the switch is in the first state, and releasing energy into the capacitor via a diode when the switch is in the second state;
a first control unit configured to controllably change the switch between its first and second states to controllably charge the capacitor to a voltage of about 15-40 volts DC with electrical energy from the battery, the first control unit controlling the switch to draw about 15 mA to about 100 mA from the battery while charging the capacitor; and
a second control unit configured to controllably release energy stored in the capacitor to the solenoid to change the valve state;
wherein the circuit is capable of opening a solenoid characterized as follows—10-20 mH, opening when driven by 500 mA at 5.2 VDC—for 9.5 years from manufacture of the batteries when powered by four AA 1.5 VDC alkaline dry cells; and
wherein the second control unit is programmed to control whether or not the first control unit charges the capacitor with electrical energy from the battery and wherein the second control unit is programmed to prevent the first control unit from charging the capacitor with electrical energy from the battery while energy stored in the capacitor is being released to the solenoid to change the valve state.

* * * * *